United States Patent
Dummersdorf et al.

[19]

[11] Patent Number: 5,820,827
[45] Date of Patent: Oct. 13, 1998

[54] METHOD AND DEVICE FOR DELIVERING HOT, AGGRESSIVE MEDIA

[75] Inventors: Hans-Ulrich Dummersdorf, Burscheid; Helmut Waldmann; Helmut Härle, both of Leverkusen; Franz-Rudolf Minz, Dormagen; Fritz Gestermann, Leverkusen, all of Germany

[73] Assignee: Bayer Aktiengesellschaft, Leverkusen, Germany

[21] Appl. No.: 867,118

[22] Filed: Jun. 2, 1997

Related U.S. Application Data

[62] Division of Ser. No. 554,331, Nov. 6, 1995, Pat. No. 5,660,810.

[30] Foreign Application Priority Data

Nov. 14, 1994 [DE] Germany .......................... 44 40 632.0

[51] Int. Cl.⁶ .............................. G05D 16/00; B01J 10/00
[52] U.S. Cl. .......................... 422/112; 422/110; 422/231; 422/234; 422/129
[58] Field of Search .................................... 422/112, 129, 422/110, 216, 234, 235, 231; 423/502, 659, DIG. 12

[56] References Cited

U.S. PATENT DOCUMENTS

| 2,407,828 | 12/1946 | Gorin | 570/190 |
|---|---|---|---|
| 2,418,931 | 4/1947 | Gorin | 423/502 |
| 4,061,471 | 12/1977 | Sze | 422/189 |
| 4,119,705 | 10/1978 | Riegel et al. | 423/507 |
| 4,338,096 | 7/1982 | Mayes | 422/110 |
| 4,479,918 | 10/1984 | Hoeppel | 422/112 |

FOREIGN PATENT DOCUMENTS

| 2266679 | 10/1975 | France . |
| 2332054 | 6/1977 | France . |
| 557617 | 8/1932 | Germany . |
| 1079003 | 4/1960 | Germany . |
| 2813506 | 10/1978 | Germany . |
| 1329097 | 9/1973 | United Kingdom . |

OTHER PUBLICATIONS

J. Pinkava, "Laboratoriumstechnik kontinuierlicher chemischer Prozesse," pp. 206–211, Harri Deutsch, Frankfurt/Main (1962).

A. Kassatkin, "Chemische Verfahrenstechnik,"vol. 1, pp. 140–143, Veb Verlag Technik Berlin (1953).

*Primary Examiner*—Hien Tran
*Attorney, Agent, or Firm*—Sprung Kramer Schaefer & Briscoe

[57] ABSTRACT

In the method for the chemical reaction of gaseous educts, the educts are brought to reaction in a phase contact apparatus 1 in the presence of a catalytically active corrosive liquid. This corrosive liquid is delivered hydropneumatically in an intermittent cycle in the circuit from a sump vessel 4 connected to the lower end of the phase contact apparatus 1 to a supply vessel 9, connected to the upper end of the phase contact apparatus (delivery cycle), from which the corrosive liquid drains through the phase contact apparatus 1 and a connecting line 11 connected at its lower end and then collects in the sump vessel 4 (drainage cycle).

5 Claims, 1 Drawing Sheet

METHOD AND DEVICE FOR DELIVERING HOT, AGGRESSIVE MEDIA

This application is a divisional of application Ser. No. 08/554,331, filed on Nov. 6, 1995, now U.S. Pat. No. 5,660,810.

The invention concerns a method and a device for delivering corrosive media at high temperatures such as, for example, molten salts, such as those used for catalysis and as a reaction medium in the Deacon process for the oxidation of HCl with oxygen to produce chlorine, or for other processes where a gas stream (educt stream) is to be brought into contact with a hot, highly corrosive medium, for example a molten salt acting as a catalyst.

Magnetically coupled pumps for delivering hazardous media, to avoid the use of pump shaft seals, are known in the art. In these pumps, the delivery medium is also used for lubrication of the bearing, which is generally located in the proximity of the internally operating magnets, thus filling the entire interior space of the pump. For lower-temperature (<300° C.) corrosive media, various materials can be used for the entire interior space of the pump. Also known in the art is the practice of using e.g. floating ring seals to seal the pump space from the pump interior space and separately lubricating the shaft bearings located in the proximity of the inner magnets, e.g. through a side stream of the delivery medium. These pumps have the disadvantage that highly corrosive media cannot be delivered. If, in addition to this problem, it is also the case that the highly corrosive media to be delivered are of a high temperature (>300° C.), as in the case e.g. of molten salts, no sealing material exists which is capable of meeting these two requirements for temperature resistance and corrosion resistance. Moreover, at higher temperatures the inner pump magnets progressively lose their magnetism, this disappearing completely at temperatures above 400° C. for the currently known magnetic materials, with the result that the pump becomes unusable. Utility Model 8 711 555.7 describes a pump set for delivering hot media which includes a cooling flow control such that the cooling flow of the electric motor driving the pump is directed towards the bearing carriers and magnetic coupling. By this means, which simplifies constructional design, the operating temperature of the magnets and the bearings is reduced, even in the delivery of hot media, and the pump remains capable of operation. Such a pump, however, is not suitable for delivering media which are hot and highly corrosive, such as molten salts, since within the inner space the medium comes into contact with a large number of parts which would be corroded by the molten salt within a very short time.

A magnetically coupled pump for delivering hot delivery media is proposed in DE 4 212 982. The objective of this invention, likewise, is to cool the bearings and magnets in the delivering of hot delivery media so that the bearing and magnet temperatures are limited. This object is achieved in that a coolant feed channel is provided in the drive shaft for the outer magnet carrier. The coolant feed channel is connected to a coolant gap which, in turn, is connected to the outer magnet carrier and the inside of a provided pump outer case, the cooling liquid being re-extracted from the outer case. Using a pump of this type, it is possible to deliver delivery media of between 200° and 300° C., the intended bearing temperature being a maximum of 50° to 60° C. However, the proposed pump cannot meet the requirement of assuring a safe seal against a highly corrosive delivered medium directly in its bearings nearest to the pump housing, this being unrealizable with the known sealing materials which are necessary in the proposed design. Moreover, the proposed cooling of the inner bearings would lead to crystallization of the molten salt in the bearing, resulting directly in the destruction of the latter, not only through corrosion but also through erosion. Leakage of molten salt from the pump housing through the inner bearings into the pump interior cannot be prevented with the proposed solution due to the fact that there are no suitable sealing materials available. Such an occurrence, however, would destroy the pump within a very short period of time.

Jet pumps, or so-called mammoth pumps, are also known in the art for delivering high-temperature corrosive media. These jet pumps have the disadvantage that they require large quantities of inert gas, have a poor delivery capacity, particularly for high-density media, and present the hazard of the inert delivery gas mixing with the educts or products of the gas reaction, necessitating complicated and sensitive devices in order to prevent these occurrences. Furthermore, the large quantities of pumping gas absorb a large portion of the medium which is to be delivered and thus partially vaporized, resulting in a considerable exhaust problem.

At present, there does not exist any delivery method which would be capable of delivering molten salts in the extraordinarily difficult conditions of high temperatures and simultaneous high corrosiveness presented by this product, and which no known material other than glass or ceramic can cope with.

The object of the invention, therefore, is to develop a method and a device which allow highly corrosive, high-temperature media such as e.g. molten chloride salts to be delivered at temperatures over 400° C. in a phase contact apparatus in which the highly corrosive hot medium can be treated or further processed together with another educt. In particular, an object of the invention is to have flow through the phase contact apparatus hot, aggressive media which catalyze a chemical reaction between gaseous educts in the phase contact apparatus. In addition, the apparatus by which the object is achieved is to be of simple construction, light, operationally reliable and cost-effective in operation and without moving parts in the region of the molten salt. Furthermore, the above-mentioned disadvantages of the jet pumps in the delivery of hot, aggressive media are to be avoided.

This object is achieved, according to the invention, in that the corrosive liquid is delivered hydropneumatically in an intermittent cycle in the circuit from a sump vessel connected to the lower end of the phase contact apparatus to a supply vessel, connected to the upper end of the phase contact apparatus (delivery cycle), from which the corrosive liquid drains through the phase contact apparatus and a connecting line connected at its lower end and then collects in the sump vessel (drainage cycle).

The method is preferably conducted so that
a) the pressure medium used for hydropneumatic delivery is a gaseous educt mixture which is supplied firstly to the sump vessel and from there, through a gas line equipped with a valve, to the phase contact apparatus,
b) the gas line valve is temporarily closed during the delivery phase so that a gas pressure builds up in the sump vessel which is sufficient for the liquid present in the sump vessel to be delivered hydropneumatically into the supply vessel through an immersion tube which extends into the liquid in the sump vessel and a liquid line connected to it, and
c) the gas line valve is then reopened, whereby the gas pressure in the sump vessel drops, the delivery cycle is ended and the drainage cycle is recommenced.

The cross section of the connecting line between the phase contact apparatus and the sump vessel is advantageously dimensioned so that the drop in pressure on the connecting line caused during the delivery cycle by inflowing educt gas is greater than or equal to a predefined differential pressure $p_s-p_k$, where $p_s$ is the overpressure generated by compression of the educt gas in the sump vessel and $p_k$ is a constantly regulated working pressure in the phase contact apparatus.

In addition, constant regulation of the overpressure $p_s$ generated by compression in the sump vessel is advantageously effected by resetting of the gas line valve.

The compression in the sump vessel is expediently commenced, thereby switching on the delivery cycle, if the liquid level in the sump vessel or in the supply vessel exceeds a first limiting value and is switched off if the liquid level falls below a lower limiting value. If the liquid level in the sump vessel is measured, the delivery cycle is started if an upper fill level limiting value is exceeded and switched off if a lower fill level limiting value is not attained.

A further advantage is constituted by the fact that the same gas pressure $p_k$ is always maintained in the phase contact apparatus and in the supply vessel.

The method according to the invention is particularly suitable for the catalytic oxidation of hydrochloric acid with oxygen. In this case, a mixture of hydrochloric acid and oxygen is used as a gaseous educt and a $KCl/CuCl_2$ molten salt is used as a catalytically active liquid delivered within the circuit.

The device for executing the method according to the invention consists of a phase contact apparatus with feed lines for the gaseous educt and for the corrosive liquid delivered through the phase contact apparatus, in addition to offtake lines for the liquid and for the gaseous product produced in the phase contact apparatus. The distinctive features of the invention are that a) the offtake line for the liquid passes, via a connecting line, to a sump vessel disposed underneath the phase contact apparatus, b) the feed line for the liquid is connected to a supply vessel disposed above the phase contact apparatus, c) a compressor for feeding and compressing the gaseous educt is connected before the sump vessel, d) in respect of the gas, the sump vessel is connected to the phase contact apparatus through a gas line which includes a valve and, in respect of the liquid, it is connected to the supply vessel through a delivery line, e) the lower end of the delivery line within the sump vessel has an immersion tube which extends into the liquid, and f) the supply vessel or sump vessel has a fill level measuring device which closes the gas line valve upon attainment of a first limiting value and reopens it upon attainment of a second limiting value.

The sump vessel is advantageously connected to a pressure regulator which keeps the gas pressure in the sump vessel constant with the gas line valve as the actuating element.

It is furthermore advantageous if the phase contact apparatus and the supply vessel are additionally connected by a pressure compensation line and if there is a further pressure regulator which keeps the pressure constant in the phase contact apparatus and therefore also in the supply vessel.

A heat exchanger can be connected before the sump vessel, in the line carrying the educt gas, for the purpose of tempering the gaseous educt.

Another, further, development is that therein the connecting line between the phase contact apparatus and the sump vessel is very short and, in particular, is constructed as an opening in the base of the phase contact apparatus, the sump vessel then being directly connected to it.

Figure 1:
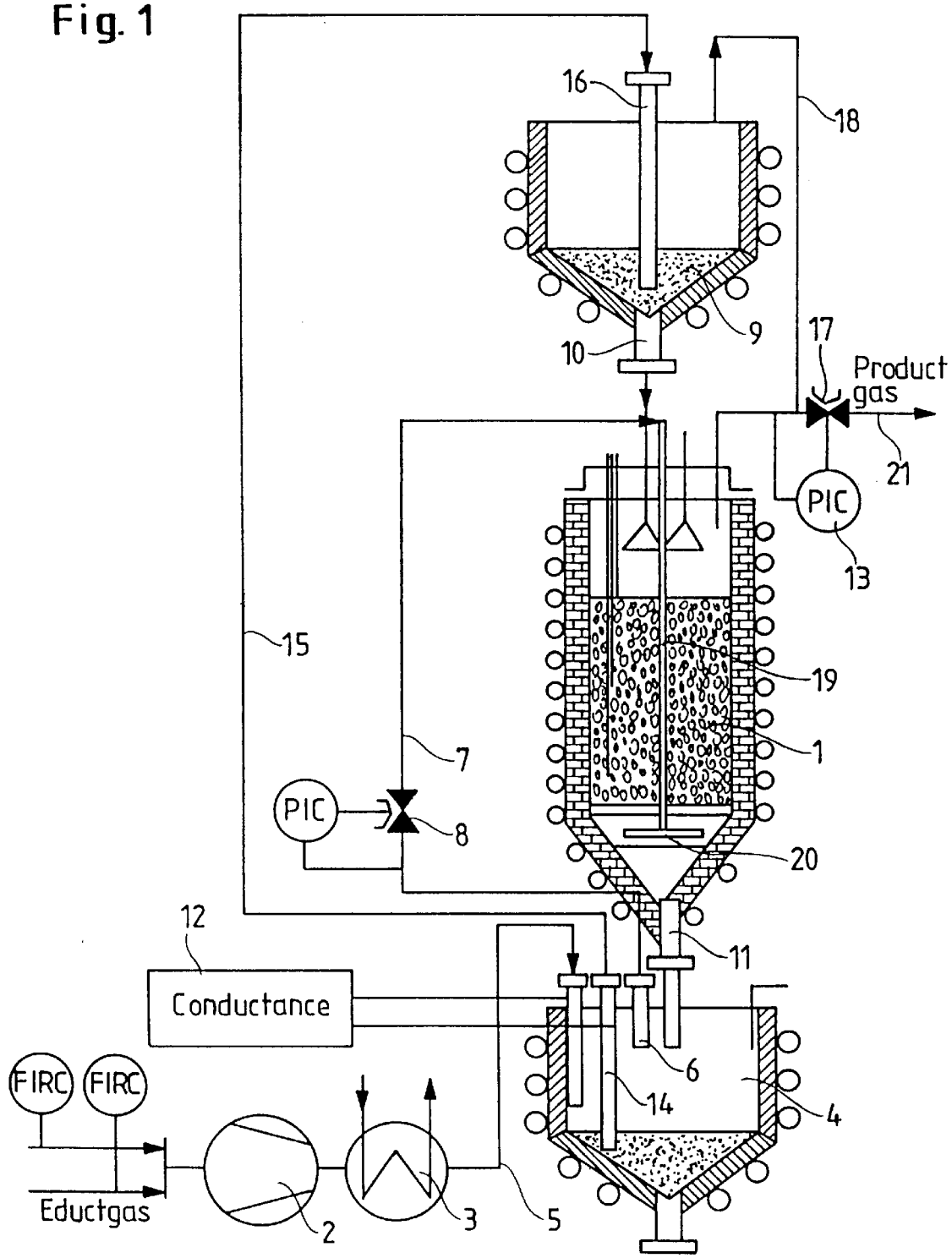
FIG. 1 is a schematic representation of the process according to the invention.

The invention is described below with reference to the Deacon process as an exemplary embodiment. In this process, a mixture of HCl and oxygen is catalytically oxidized to form chlorine. The catalyst used is a $KCl/CuCl_2$ molten salt, to which is fed the $HCl/O_2$ mixture, in a counterflow to the downflowing molten salt catalyst. For this purpose, the molten salt acting as a catalyst must be delivered within the circuit on to the head of the phase contact apparatus 1. The educt gas stream consisting of the $HCl/O_2$ mixture which is to be processed in the phase contact apparatus 1 and which, according to existing art, is fed directly to the phase contact apparatus 1, is instead compressed by a compressor 2, if necessary being pre-heated to reaction temperature in a heat exchanger 3, and then fed to the sump vessel 4 through the connection piece 5. The educt gas leaves the sump vessel 4 again through the connection piece 6 and the connected gas line 7 in which there is disposed a regulating valve 8. The gas line 7 leads to the upper end of the phase contact apparatus 1, where a substance exchange occurs in a counterflow with the highly corrosive hot molten salt. For this purpose, the highly corrosive hot medium must be delivered within the circuit through the phase contact apparatus 1.

The hot molten salt is supplied from a supply vessel (top vessel) 9 disposed above the phase contact apparatus 1 through a supply pipe 10 which leads to the head of the phase contact apparatus 1. The molten salt then passes through the phase contact apparatus 1 and then flows through a connecting pipe 11 into the sump vessel 4. In the course of this process, therefore, the supply vessel 9 is emptied and the sump vessel 4 is filled from the phase contact apparatus 1 through the connecting line 11. The connecting line 11 can also be kept very short and, in particular, can be constructed as an opening (aperture) to which the sump vessel 4 is directly connected. The fill level in the sump vessel 4 can be measured by a conductivity level indicator 12. If a defined level is exceeded in the sump vessel 4, then the regulating valve 8 in the gas line 7 is fully or partially closed. As a consequence, the compressed educt gas in the sump vessel 4 flows mainly or entirely through the connecting line 11 or aperture into the phase contact apparatus 1. The cross section of the connecting line 11 or aperture between the sump vessel 4 and the phase contact apparatus 1 is dimensioned so that the drop in pressure on the connecting line or aperture caused by the inflowing educt gas is greater than or equal to a predefined differential pressure $p_s-p_k$, where $p_s$ is the overpressure generated by compression of the educt gas in the sump vessel and $p_k$ is the working pressure in the phase contact apparatus 1. This working pressure is kept constant, expediently, by a pressure regulator 13 connected at the outlet of the phase contact apparatus 1. The compression pressure of the compressor 2 is thus dynamically reduced to the pressure $p_k$ in the phase contact apparatus 1 on the basis of the loss of pressure on the connecting line 11 caused by the gas flow, so that the substantially higher compression pressure $p_s$ prevails in the sump vessel 4. As a consequence, the molten salt present in the sump vessel 4 is pressed into the immersion tube 14 and then through the ascending line 15 leading to the supply vessel 9. By means of the regulating valve 8 in the gas line 7, the pressure in the sump vessel 4 is constantly adjusted to such a value that the pressure in the sump vessel 4 is at least equal to the sum of hydrodynamic pressure of the delivery medium and flow pressure loss in the ascending line 15. The overpressure prevailing at this point in time in the sump vessel 4 is thus sufficient to effect hydropneumatic delivery of the molten salt present in the sump vessel through the immersion tube 14 and the ascending line 15 into the supply vessel 9. Instead of the educt gas compressed by the compressor 2, another gas, e.g. an inert gas fed to the sump vessel 4 in an intermittent cycle, could be used for hydropneumatic delivery. The liquid line or ascending line 15 is connected at the upper end of the supply vessel 9 to an immersion tube 16 which extends into the liquid.

If the fill level in the sump vessel 4 falls below a predefined lower limiting value, which in turn is indicated by the fill level indicator or conductivity level indicator 12, then the regulating valve 8 in the gas line 7 is reopened and the educt gas can again flow via the usual path through the gas line 7 into the phase contact apparatus 1. This completes the delivery phase. During this delivery phase, molten salt will have collected at the lower end of the phase contact apparatus 1. Due to the pressure equalization, this can now drain back into the sump vessel 4. This process can be promoted in that, following opening of the regulating valve 8, a regulating valve 17 assigned to the pressure regulator 13 can be closed somewhat more, so that the pressure in the phase contact apparatus 1 is increased. Following completion of the delivery phase, the molten salt which has now collected in the supply vessel 9 drains via the supply pipe 10, through the phase contact apparatus 1 and the connecting line 11, back into the sump vessel 4 (drainage phase). After the drainage phase, a new delivery cycle recommences. The molten salt is thus delivered in an intermittent cycle out of the sump vessel 4 into the supply vessel 9. This operation is normally periodic, although irregular time cycles can also be used.

A pressure compensation line 18 between the supply vessel 9 and the phase contact apparatus 1 assures that the pressure in the phase contact apparatus 1 and the pressure in the pressure vessel 9 is always equal so that the molten salt can flow unimpeded in all phases of the delivery process out of the supply vessel 9 via the supply tube 10 into the phase contact apparatus 1, this being of importance to the substance transfer process in the phase contact apparatus 1.

In the method according to the invention, the energy required for delivering the molten salt is taken from the compressed educt gas. During the delivery phase, the educt gas can flow partially through the gas line 7 and partially through the connecting line 11 into the phase contact apparatus 1. This is of no consequence for the reaction and substance transfer process occurring in the phase contact apparatus 1, since the gas enters, in both the delivery phase and the reduction phase, at the lower end of the phase contact apparatus 1. For this purpose, the gas line 7 is connected to a connection piece 19 which leads to a gas distributor 20 in the lower third of the phase contact apparatus 1.

The following advantages are achieved with the method or installation according to the invention:

There are no moving parts such as pumps or valves in the region of the hot corrosive liquid (molten salt). This is an essential condition for operationally reliable delivery of a hot corrosive molten salt over long holding periods. The method is basically suitable for the delivery of all hot, highly corrosive media, allowing operation even at temperatures above 500° C. Only few additional installation components are required, so that the investment costs are low. The operating costs can also be kept relatively low, since the method or the apparatus according to the invention operates reliably and without malfunction over long periods due to the fact that there are no moving parts in parts of the installation which are subjected to corrosion and temperature hazard. Nor, within certain limits, is the delivery process disturbed by crystallization or sedimentation in the delivery medium.

Process example

The process example described is the production of chlorine using the above-mentioned Deacon process.

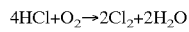

In the production of 3 t/h of chlorine by the Deacon process, which is catalyzed by a $KCl/CuCl_2$ molten salt, a falling film reactor is used as a phase contact apparatus 1. In order to achieve this throughput, molten salt must be supplied to the head of the phase contact apparatus 1 at a rate of 1 $m^3/h$. For this purpose, the highly corrosive molten salt, at a temperature of 500° C., must be delivered over a height of about 10 m, requiring a minimum delivery pressure of 2.5 bar for a density of 2.4 $g/cm^3$. In this experiment, the sump vessel 4 and the supply vessel 9 each had a volume of 2 $m^3$. During the operating state, in which the hot molten salt flows continuously out of the supply vessel 9 on to the head of the phase contact apparatus 1 (drainage phase), the educt mixture, consisting of a stoichiometric mixture of HCl and $O_2$, is compressed by means of the compressor 2 to about 0.1 bar overpressure to overcome the pressure losses in the phase contact apparatus 1. Following the compressor 2, the educt gas mixture is heated in the heat exchanger 3 to about 200° C. and flows through the connection piece 5 into the sump vessel 4. From there, the educt gas mixture flows on into the connection piece 6 and through the gas line 7 to the gas distributor 20 in the lower third of the phase contact apparatus 1. In this way, the educt gas flows along the melt coming in the opposite direction, with simultaneous reaction of the educt gas components to produce chlorine. The product gas (chlorine) then leaves the phase contact apparatus 1 via the product line 21, to which is connected the pressure regulator 13.

If the level of molten salt in the sump vessel 4 approaches the upper level, the level indicator 12 sends an appropriate signal to the regulating valve 8 which then closes until a pressure of 2.5 bar is attained in the sump vessel 4. The mass flow controlled compressor 2 compresses the educt mixture to a pressure of 3 bar. A lesser portion of the educt gas mixture then flows through the gas line 7 and the greater portion through the connecting line 11 into the phase contact apparatus 1, where the reaction process occurs in the same manner as before. However, unlike the previous mode of operation (with regulating valve 8 open), an overpressure of 3 bar now builds up in the sump vessel 4. This pressure is kept constant with the aid of a pressure regulator which operates the regulating valve 8 as the actuating element. Due to the overpressure in the sump vessel 4, the molten salt now rises through the immersion tube 14 in the sump vessel 4 and the ascending line 15 into the supply vessel 9. As already described above, the connecting line 11 is dimensioned so that the educt gas mixture in the connecting line 11 decompresses from 3 bar in the sump vessel 4 to the operating pressure inside the phase contact apparatus 1. In the case of the above-mentioned gas throughput, the connecting line 11 must have a diameter of e.g. about 0.2 m for a pressure difference of 2.5 bar.

In the further course of the delivery phase, the fill level continues to rise in the supply vessel 9 due to the overflow of molten salt in the ascending line 15, while the level in the sump vessel 4 is correspondingly decreased. If a predefined fill level is not attained in the sump vessel 4, the regulating valve 8 in the gas line 7 is reopened by a control signal from the conductivity level indicator 12. This causes the pressure in the sump vessel 4 to drop back to the normal operating pressure of 0.1 bar overpressure. The molten salt which has collected at the base of the phase contact apparatus 1 during the delivery phase can now flow off unimpeded into the sump vessel 4. The discharge of molten salt can be promoted by briefly creating a slight overpressure by closing the regulating valve 17 in the product line 21. The pressure compensation line 18 ensures that there is a uniform melt flow from the supply vessel 9 into the phase contact apparatus 1, irrespective of the pressure conditions prevailing in the phase contact apparatus 1.

The educt gas throughput can be used to effect sensitive adjustment of the pressure loss through the connecting line 11 during the molten salt delivery phase. Depending on the dimensioning of the vessels 4 and 9 and of the phase contact apparatus 1, the delivery phase, which commences with the closure of the regulating valve 8 and ends with the opening of the regulating valve 8, will take a few minutes while the drainage phase, in which the supply of molten salt drains from the supply vessel 9 through the phase contact apparatus 1 into the sump vessel 4, is in the order of one hour. This phase can be reduced or extended as required by appropriate dimensioning of the phase contact apparatus 1, the supply vessel 2 and the sump vessel 4. In this process, therefore, the molten salt is delivered in cyclic intervals within the circuit through the phase contact apparatus 1 (intermittent cycle circuit delivery).

We claim:

1. Apparatus for reacting a catalytically active corrosive liquid with a gas, comprising a counter-flow phase contact vessel (1), a supply vessel (9) disposed above said counter-flow phase contact vessel and a sump vessel (4) disposed below said counter-flow phase contact vessel; said sump vessel and said supply vessel each being designed to hold said corrosive liquid while maintaining a gas space above said corrosive liquid; a compressor (2) for feeding a gas to said sump vessel through a first gas supply line (5), a heat exchanger (3) optionally being disposed on said first gas supply line between said compressor and said sump vessel, said first gas supply line entering said sump vessel at the top thereof, and being designed to discharge said gas into the gas space in said sump vessel and above the level of corrosive liquid to be held in said sump vessel; a gas outlet (6) in the top of said sump vessel leading the top of said counter-flow phase contact vessel (1), through a second gas supply line (7) and having a first control valve (8) in said second gas supply line (7), said second gas supply line being connected to a tube at the top of said counter-flow phase contact vessel (1) which passes downwardly through said counter-flow phase contact vessel (1) to the bottom thereof, where the tube terminates in a gas distributor for distributing gas upwardly through said counter-flow phase contact vessel; an immersion tube (14) passing through the top of said sump vessel, the bottom of the immersion tube being open to receive corrosive liquid to be stored in said sump vessel, and the top of the immersion tube being connected to a liquid supply line (15) leading to an immersion tube in supply vessel (9); a first liquid discharge line (10) connecting the bottom of supply vessel (9) to the top of counter-flow phase contact vessel (1), a second liquid discharge line (11) connecting the bottom of counter-flow contact vessel (1) with the top of sump vessel (4), a product gas line having a second control valve (17) at the top of counter-flow phase contact vessel (1) for discharging product gas from counter-flow phase contact vessel (1) and a gas vent line leading from the top of said supply vessel (9) and joining said product gas line at a point between said counter-flow phase contact vessel (1) and said second control valve (17); whereby, in operation, with first control valve (8) in the open position, a gas feed is compressed in compressor (2), discharged into sump (4) and flows from sump (4) through the second gas supply line (7) and said tube at the top of said counter-flow phase contact vessel (1) to the bottom of the phase contact vessel (1), where the gas feed is discharged into phase control vessel (1) through the gas distributor (20); and whereby the corrosive liquid, which is held in supply vessel (9) flows downwardly out of supply vessel (9) through the first liquid discharge line (10) into the top of phase contact vessel (1) where the corrosive liquid passes downward through counter-flow phase contact vessel (1) thereby coming into counter-current contact with the gas which flows upwardly from gas distributor (20), and the product gas is discharged from counter-flow contact vessel (1) through second control valve (17); the corrosive liquid passing downwardly through counter-flow phase contact vessel (1) is discharged from the bottom of counter-flow phase contact vessel (1) through second liquid discharge line (11) into sump vessel (4) and, when the amount of said corrosive liquid discharged into sump vessel (4) builds up in sump vessel (4) to a predetermined level, control valve (8) is fully or partially closed, whereby the gas flowing into sump vessel (4) through line (5) causes an increase in pressure in sump vessel (4) which in turn causes corrosive liquid in sump vessel (4) to be hydropneumatically forced into immersion tube (14) and through the liquid supply line (15) into supply vessel (9) until a second predetermined level of liquid in sump vessel (4) is reached, whereupon valve (8) is opened and the operation repeats itself.

2. Apparatus according to claim 1, wherein the sump vessel (4) is connected to a pressure regulator which keeps the gas pressure in the sump vessel (4) constant through operation of the regulating valve (8).

3. Apparatus according to claim 1 wherein a pressure regulator (13) is disposed between the gas vent line and the product gas line for keeping the pressure constant in the phase contact vessel and also in the supply vessel (9).

4. Apparatus according to claim 1 wherein the heat exchanger (3) is disposed on said first gas supply line (5) between said compressor (2) and said sump vessel (4).

5. Apparatus according to claim 1 wherein the connecting line (11) is formed as a hole in the bottom of the phase contact vessel (1), the sump vessel being directly connected to said hole.

* * * * *